J. T. STANTON.
COTTON HARVESTER.
APPLICATION FILED JULY 12, 1920.
1,373,269.
Patented Mar. 29, 1921.
3 SHEETS—SHEET 3.
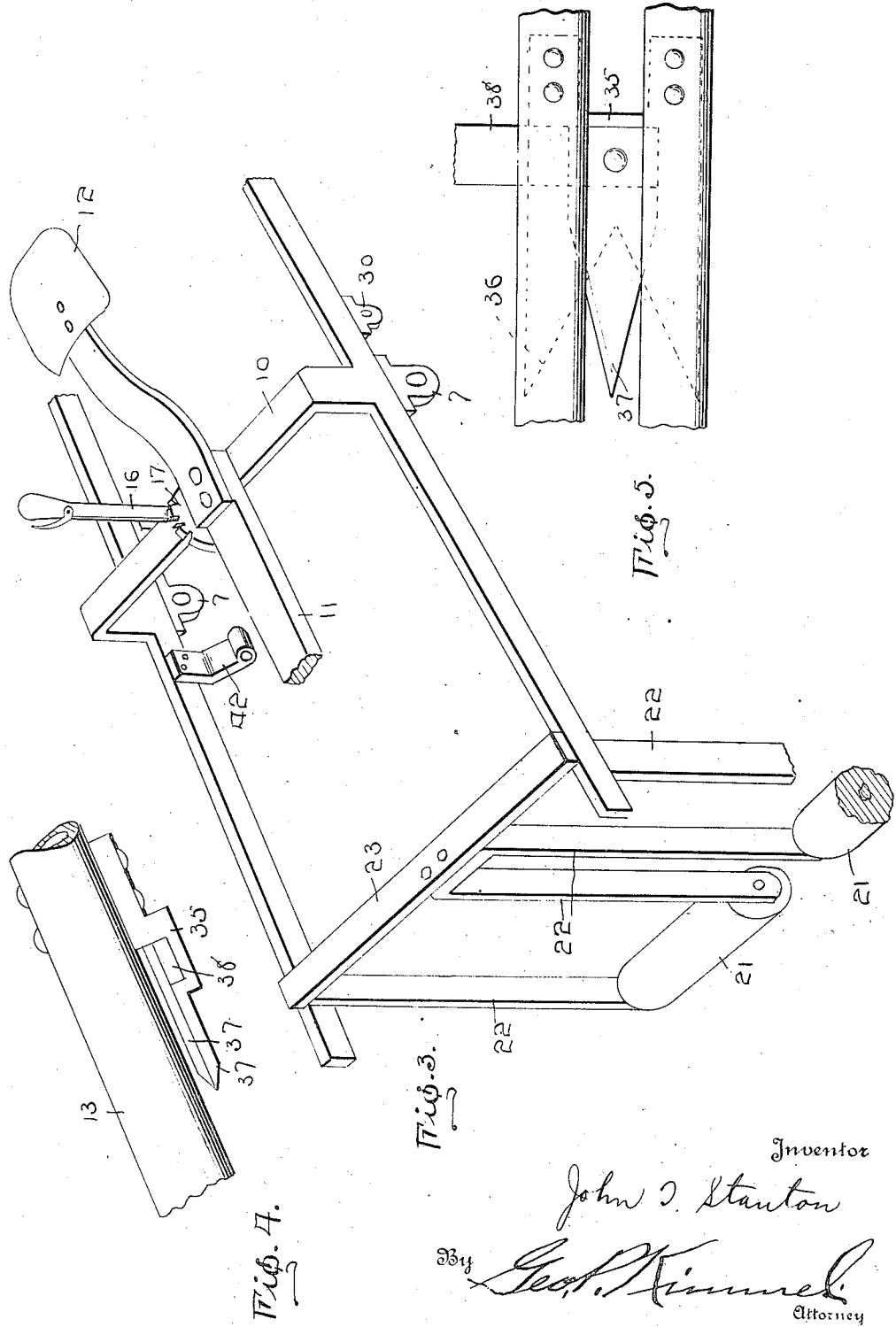
Inventor
John T. Stanton
By Geo. P. Kimmel
Attorney

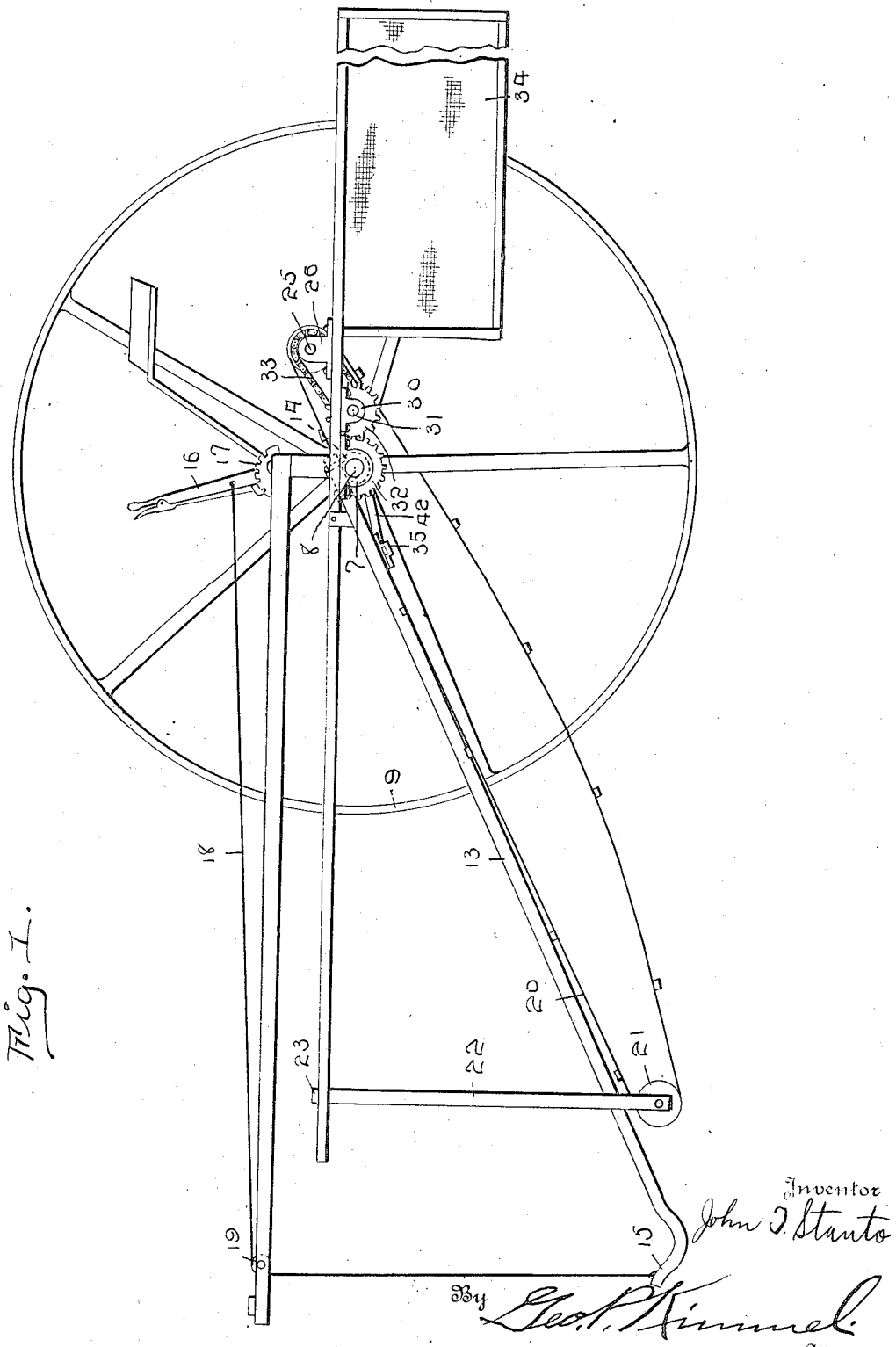

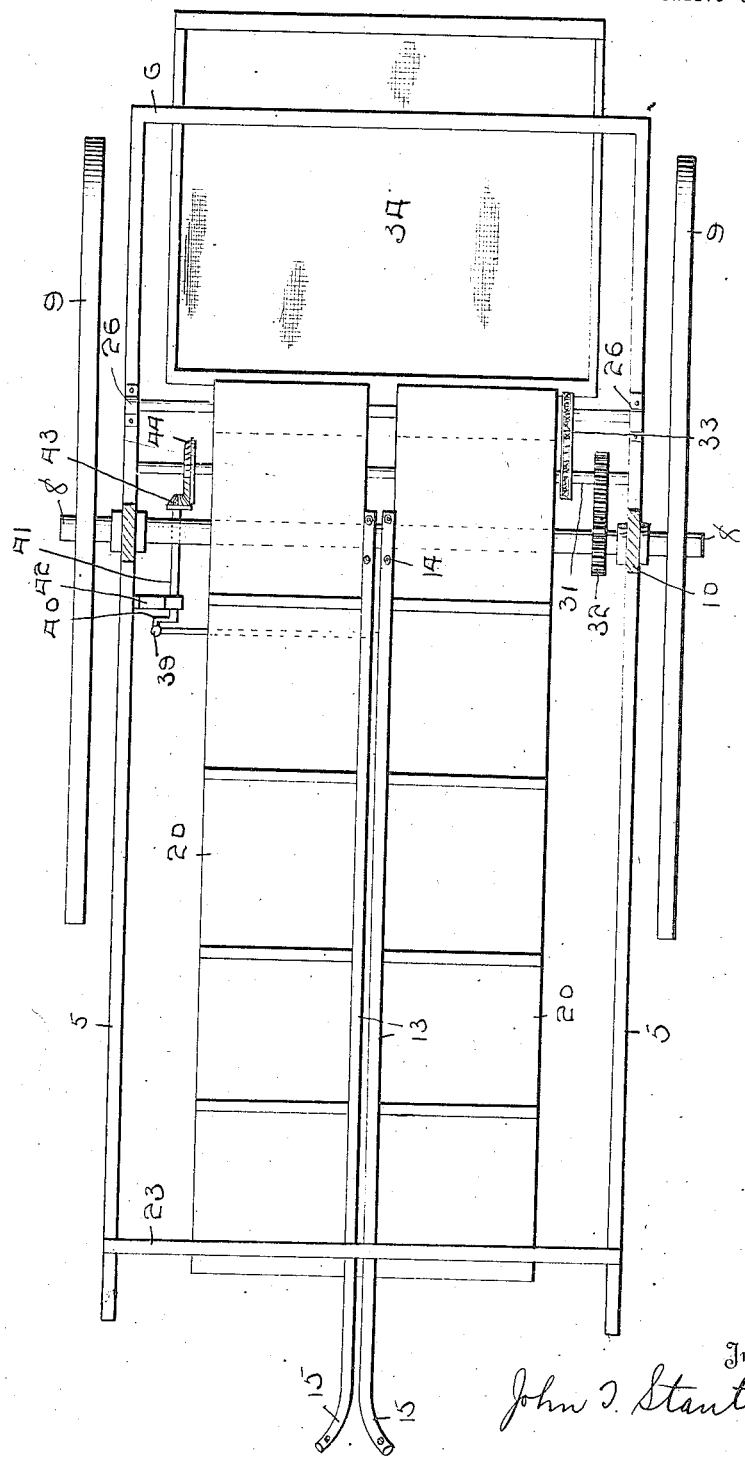

UNITED STATES PATENT OFFICE.

JOHN T. STANTON, OF CHILDRESS, TEXAS.

COTTON-HARVESTER.

1,373,269.

Specification of Letters Patent.   Patented Mar. 29, 1921.

Application filed July 12, 1920.   Serial No. 395,450.

*To all whom it may concern:*

Be it known that I, JOHN T. STANTON, a citizen of the United States, residing at Childress, in the county of Childress and State of Texas, have invented certain new and useful Improvements in Cotton-Harvesters, of which the following is a specification.

This invention relates to improvements in cotton harvesters and has for its principal object to provide a machine of this character provided with an improved arrangement of combined gathering and picking arms which are so arranged as to embrace the plant and effectively detach the cotton therefrom, the arms being associated with a cutting mechanism for effecting the removal of the stems of the cotton bolls to permit the latter to fall from the arms.

A further object is the provision of means for adjustably supporting the picker arms according to the elevation of the row of plants to be operated upon.

A still further object resides in the novel arrangement of conveyers for receiving the picked cotton and depositing the same in a suitable receptacle from which it is periodically removed during the progress of the harvester.

With these and other objects in view, the invention consists in certain novel features of construction as hereinafter shown and described and then specifically pointed out in the claims and in the drawings illustrative of the preferred embodiment of the invention.

Figure 1 represents a side elevation of the improved harvesting machine, the adjacent supporting wheel being removed.

Fig. 2 represents a top plan view thereof, the draft pole and support therefor being removed, and, Fig. 3 represents a fragmentary perspective view of the frame structure of the harvester illustrating the arrangement of the pole and seat supporting member.

Figs. 4 and 5 represent fragmentary side and top plan views, respectively, of the cutting mechanism.

Referring to the drawing in detail, wherein similar reference numerals designate corresponding parts through the several views, the numeral 5 indicates a frame structure consisting of parallel side members and a rear transverse member 6. Bearings 7 are secured to the underside of the longitudinal side members of the frame structure and support the rotary axle 8 carrying the relatively large supporting wheels 9 upon which the harvester is movably mounted. The side members 5 are connected at a point directly above the axle 8 by a connecting bar 10 having connection with a preferred type of draft pole 11 which extends forwardly from the axle and by which the harvester is propelled. The pole is further utilized as a support for a seat 12 which the driver of the machine occupies.

A pair of closely arranged parallel picker bars 13 is provided at their rear extremities with U-shaped clips 14 which embrace the medial portion of the axle 8 and pivotally support the arms 13 in position thereon. The picker arms extend forwardly and downwardly from the axle and are provided with upwardly directed and diverging front terminals 15 to receive and guide the stalks of the plants in such manner as to cause them to pass between the arms as the harvester passes thereover.

A hand lever 16 controlled by a suitable locking mechanism 17 is arranged laterally of the draft pole 11 and is connected with one terminal of a flexible cable 18 which extends forwardly and downwardly over a guide pulley 19 and is connected with the front extremities of the arms 13 for varying the limit of the downward movement thereof according to the elevation of the plants.

Closely arranged conveyers 20 are arranged on opposite sides of the arms 13 and are supported at their forward extremities upon rollers 21 journaled in bearings 22 depending from the front extremities of the side members 5 of the frame structure and a connecting bar 23 extending horizontally thereover at a point above the arms 13 to permit the stalks to pass upwardly therebetween. A shaft 25 is journaled in bearings 26 arranged under the side members 5 rearwardly of the axle 8 and supports a second pair of rollers which coact with the front rollers 21 to support the conveyers 20 at substantially the same angle of inclination in which the picker arms 13 are normally disposed.

Another pair of bearings 30 is arranged beneath the side members 5 intermediate the bearings 7 and 26 and support an intermediate horizontal shaft 31 which is driven from the axle 8 through intermeshing gear wheels 32. Movement of the intermediate shaft 31 is transmitted to the upper roller supporting shaft 25 through a chain 33 mounted to travel upon suitable socket wheels arranged upon the shafts 31 and 25 whereby the conveyers 20 are caused to travel in a direction to move the cotton bolls deposited thereon rearwardly of the frame structure and into the receiver 34.

Adjacent their upper ends, the picker arms 13 are connected by an angular guide plate 35 having a channel 36 therein disposed transversely of the frame structure 5 and terminating in a pair of forwardly directed fingers 37 which latter are suitably beveled to provide cutting edges for coaction with the reciprocating cutting blade 37 arranged in facial abutment to the fingers 36. The movable or reciprocating blade 37 is arranged to engage and sever stems and stalks which are forced upwardly between the picker arms during the operation of the harvester so as to cause the cotton bolls carried by the stems to fall upon and be carried by the conveyers 20 into the receiving receptacle 34.

The reciprocating blade 37 is carried by a pitman 38 which is loosely mounted in the channel 36 of the guide 35 to permit of a limited vertical swinging movement of the picker arms 13 with relation to the pitman. The opposite extremity of the pitman is connected by a universal joint 39 with a crank arm 40 of an inclined shaft 41 suitably mounted in bearings 42 and provided at its rear terminal, behind the axle 7 with a relatively small bevel gear wheel 43 meshing with a larger gear wheel 44 whereby rotary movement of the shaft 31 is transmitted to the shaft 41 and thence to the pitman 38 causing reciprocation of the latter together with the blade 37.

During operation, the divergent gathering terminals 15 of the arms 13 are adjusted vertically by proper manipulation of the hand lever 16 so as to engage the stalks of the plants during travel of the harvester. Such stalks as are encountered, pass upwardly between the arms 13 and the conveyers 20 and the unpicked cotton bolls are thus stripped from the plants and, falling upon the conveyers 20 are carried upwardly and deposited in the receiving receptacle 34. In instances where the cotton boll is detached with a portion of the stem, the latter traveling upwardly between the arms 13 encounters the reciprocating blade 37 which severs the stem permitting the boll to fall upon the conveyer 20 and be carried to the receiver.

What I claim is:

1. In a cotton harvester, a wheel mounted frame structure, closely arranged stripping arms mounted in the frame structure and disposed in an inclined plane, conveyers arranged on opposite sides of the arms, and a receiver for the material carried by the conveyers.

2. In a cotton harvester, a wheel mounted frame structure, stripping arms pivotally mounted therein and normally disposed in an inclined plane to receive and strip the stalks of plants passing therebetween, an adjusting lever mounted on the frame structure, a flexible connection between the lever and the front ends of the arms, conveying means associated with the arms, a cutting mechanism arranged adjacent the upper extremities of the arms for severing the stalks and stems of plants passing therethrough, an intermediate shaft operated from the wheel of the frame structure and driving connections from the intermediate shaft to the conveying means and cutting mechanism.

3. In a cotton harvester, a wheel mounted frame structure, stripping arms pivotally supported in the frame structure, conveyers associated with the stripping arms, a relatively stationary element carried by the arms, a movable cutting element associated with the first mentioned cutting element, an intermediate shaft operatively connected with the supporting wheels of the frame structure, a crank shaft connected with the intermediate shaft and supported in the frame structure, and a pitman connecting the crank arm of the crank shaft with the movable cutting element to permit vertical adjustment of the stripping arms.

In testimony whereof, I affix my signature hereto.

JOHN T. STANTON.